US012564975B2

(12) United States Patent
Flinsenberg

(10) Patent No.: US 12,564,975 B2
(45) Date of Patent: Mar. 3, 2026

(54) DETERMINING A DEVICE LOCATION ON A BODY PART

(71) Applicant: KONINKLIJKE PHILIPS N.V., Eindhoven (NL)

(72) Inventor: Ingrid Christina Maria Flinsenberg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 644 days.

(21) Appl. No.: 17/438,237

(22) PCT Filed: Mar. 9, 2020

(86) PCT No.: PCT/EP2020/056131
§ 371 (c)(1),
(2) Date: Sep. 10, 2021

(87) PCT Pub. No.: WO2020/182698
PCT Pub. Date: Sep. 17, 2020

(65) Prior Publication Data
US 2022/0176575 A1      Jun. 9, 2022

(30) Foreign Application Priority Data

Mar. 14, 2019    (EP) ..................................... 19162805

(51) Int. Cl.
*B26B 19/38* (2006.01)
*A61B 5/00* (2006.01)
(Continued)

(52) U.S. Cl.
CPC ............ *B26B 19/388* (2013.01); *G06T 7/248* (2017.01); *G06T 7/74* (2017.01); *G06T 2207/30196* (2013.01)

(58) Field of Classification Search
CPC ........ B26B 19/388; G06T 2207/30196; G06T 2207/30004; G06T 2207/10016;
(Continued)

(56) References Cited

U.S. PATENT DOCUMENTS 6,497,043 B1 * 12/2002 Jacobsen ................. B26B 21/40
                                                                            132/200
8,744,192 B2 * 6/2014 Ortins .................. A61C 17/221
                                                                            15/106
(Continued)

FOREIGN PATENT DOCUMENTS

CA            2966024 A1 * 8/2018 ............. A61B 34/20
CN        108182588 A      6/2018
(Continued)

OTHER PUBLICATIONS

International Search Report and Written Opinion, International Application No. PCT/EP2020/056131, Mailed on Jul. 22, 2020.

*Primary Examiner* — Jeffrey P Aiello

(57) ABSTRACT

According to an aspect, there is provided a method of determining a location of a device on a surface of a body part of a subject that is treated by the device during a treatment operation. The device is for performing the treatment operation on the body part, and the device comprises one or more orientation sensors for measuring the orientation of the device in a reference frame of the device. The method comprises obtaining a three dimensional, 3D, representation of the body part, the 3D representation comprising normal vectors for respective positions on the surface of the body part; receiving a plurality of orientation measurements from the one or more orientation sensors representing orientation of the device during the treatment operation on the body part; processing the received orientation measurements to determine a sequence of orientations of the device during the treatment operation; and comparing the determined
(Continued)

sequence of orientations of the device to the normal vectors and respective positions of the normal vectors to determine the location of the device on the surface of the body part during the treatment operation.

20 Claims, 4 Drawing Sheets

(51) Int. Cl.

| | | |
|---|---|---|
| *A61B 5/107* | (2006.01) |
| *A61B 34/20* | (2016.01) |
| *G01C 25/00* | (2006.01) |
| *G06T 7/246* | (2017.01) |
| *G06T 7/73* | (2017.01) |
| *G06T 17/00* | (2006.01) |

(58) Field of Classification Search
CPC . G06T 2207/20081; G06T 2207/10028; G06T 2207/10121; G06T 7/73; G06T 7/70; G06T 7/11; G06T 7/20; G06T 7/246; G06T 7/248; G06T 7/74; G06T 7/0012; G06T 2210/41; G06T 17/00; G06T 2200/04; G06T 19/20; A61B 34/20; A61B 2034/2051; A61B 5/06; G16H 40/63
USPC ........... 340/540, 573.1, 8.1, 539.12, 870.01, 340/539.22; 382/128, 154; 600/424, 600/411, 427, 300, 476; 702/153, 19, 702/189, 150, 85, 127, 104, 141, 94, 1, 702/152, 95, 188, 183, 151; 703/11
See application file for complete search history.

(56) References Cited

U.S. PATENT DOCUMENTS

| | | | | |
|---|---|---|---|---|
| 8,855,739 | B2 * | 10/2014 | Nagata ................. | A61B 5/0064 |
| | | | | 600/407 |
| 9,307,830 | B2 * | 4/2016 | Hyde ................... | A61B 5/7264 |
| 9,778,631 | B2 * | 10/2017 | Krenik ................. | G05B 15/02 |
| 2014/0137714 | A1 * | 5/2014 | Krenik ................. | B26B 19/388 |
| | | | | 83/13 |
| 2014/0200440 | A1 * | 7/2014 | Iannotti ................. | A61B 34/20 |
| | | | | 600/424 |
| 2016/0262521 | A1 * | 9/2016 | Kustra ...................... | G06T 7/38 |
| 2017/0232624 | A1 * | 8/2017 | King ................... | B26B 21/4056 |
| | | | | 30/34.05 |
| 2017/0238692 | A1 | 8/2017 | Marcon | |

FOREIGN PATENT DOCUMENTS

| | | | | |
|---|---|---|---|---|
| CN | 108237566 | A | 7/2018 | |
| EP | 3381630 | A1 | 10/2018 | |
| JP | 3780146 | B2 * | 5/2006 | ............. A61B 19/00 |
| WO | 2013096572 | A1 | 6/2013 | |
| WO | 2013163999 | A1 | 11/2013 | |
| WO | 2016113202 | A1 | 7/2016 | |
| WO | 2018108926 | A1 | 6/2018 | |

* cited by examiner

— 40

— 44

— 42

40

48
46
42-1
44-1

40

52
50
42-2
44-2

DETERMINING A DEVICE LOCATION ON A BODY PART

CROSS-REFERENCE TO PRIOR APPLICATIONS

This application is the U.S. National Phase application under 35 U.S.C. § 371 of International Application No. PCT/EP2020/056131, filed on 9 Mar. 2020, which claims the benefit of European Patent Application No. 19162805.6, filed on 14 Mar. 2019. These applications are hereby incorporated by reference herein.

FIELD OF THE INVENTION

This disclosure relates to a device that is for use in performing a treatment operation on a body part of a subject, and in particular to a technique for determining a location of the device on a surface of the body part during the treatment operation.

BACKGROUND OF THE INVENTION

Many types of device are available that can be used on a body of a subject to provide a treatment operation to the body, including a personal care operation on the body. For example, there are devices for the removal or cutting of unwanted hairs using various techniques such as shaving, clipping, electrolysis, plucking, and laser and light therapies (known as photoepilation or Intense Pulsed Light, IPL). Other types of dermatological treatments, including hair growth reduction and treating acne, can also use light-based technologies. Devices can also be used for providing a massage to the subject, for providing a nail treatment, for cleaning teeth, for providing physiotherapy, for applying patches to the subject (e.g. electrocardiogram electrodes, etc.).

Often when performing a treatment operation, it can be useful (or perhaps necessary) to make sure that all areas of the body part are treated, are treated evenly and/or are not over-treated. It can also or alternatively be useful to provide instructions or guidance to the user of the device to enable them to complete the treatment operation in a particular way (e.g. achieve a particular hair style in the case of a hair clipping operation or achieve a particular beard shape in the case of a shaving operation). Thus it is useful to monitor the location of the device on the surface of the body part during the treatment operation. Feedback can be provided to the user of the device based on this information.

For devices, such as hair trimmers/clippers and shavers, concepts have been presented in which the device location with respect to the head of the user (or the location of the device on the head of the user) is used to adjust a trimmer, for example WO 2013/163999 and WO 2013/096572). In such systems use is made of a field (e.g. electromagnetic, ultrasound, etc.) to detect the position of both the device and the head with respect to a field source. In these systems a field source or field sensor may be required to be positioned in or on the head and/or device, but this arrangement has a relatively high cost (in view of the extra components required) and requires the subject to position and wear the field source(s) or field sensor(s).

Alternatively, devices used in treatment operations often include movement sensors such as accelerometers and gyroscopes, and it has been proposed to estimate the device and head positions based on measured device movements of the head and the device (for example WO 2016/113202).

However, one of the main issues in determining the full location of a device based only on acceleration and gyroscope measurements from the device is establishing the heading of the device (i.e. the orientation in a horizontal plane). Typically, the heading of a device (in the absence of other information about the device), can usually be provided by a magnetometer or a satellite positioning system receiver in the device. However, in the case of a device for performing a treatment operation on a body part, simply knowing the orientation of the device (including the heading) is not sufficient to determine the location of the device on the body part. Therefore, the absolute orientation of the device is only useful if the full position and absolute heading of the body part is also known, which is typically not the case from acceleration and gyroscope measurements obtained by a device.

Therefore it is desirable to be able to determine the location of a device on the surface of a body part using one or more sensors in the device itself, and without requiring the subject to wear or carry additional sensors on their body or the relevant body part.

SUMMARY OF THE INVENTION

According to a first specific aspect, there is provided a method of determining a location of a device on a surface of a body part of a subject that is treated by the device during a treatment operation, wherein the device is for performing the treatment operation on the body part, and wherein the device comprises one or more orientation sensors for measuring the orientation of the device in a reference frame of the device, the method comprising: obtaining a three dimensional, 3D, representation of the body part, the 3D representation comprising normal vectors for respective positions on the surface of the body part; receiving a plurality of orientation measurements from the one or more orientation sensors representing orientation of the device during the treatment operation on the body part; processing the received orientation measurements to determine a sequence of orientations of the device during the treatment operation; and comparing the determined sequence of orientations of the device to the normal vectors and respective positions of the normal vectors to determine the location of the device on the surface of the body part during the treatment operation. Thus the first aspect provides that the location of a device on the surface of a body part can be determined using one or more orientation sensors in the device itself, without requiring the subject to wear or carry additional sensors on their body or the relevant body part.

In some embodiments, the step of comparing comprises identifying a sequence of normal vectors in the 3D representation having respective orientations that match the sequence of orientations of the device. In some embodiments, the step of comparing comprises determining a path taken by the device over the surface of the body part as the respective positions of the normal vectors in the identified sequence of normal vectors. In some embodiments, the step of comparing comprises determining the location of the device on the surface of the body part as the position associated with a normal vector on the surface of the body part that has an orientation that matches a final orientation in the sequence of orientations of the device.

In some embodiments, the device further comprises one or more movement sensors for measuring movement of the device; the method further comprises receiving a plurality of movement measurements from the one or more movement sensors representing movement of the device during the treatment operation on the body part; the step of processing comprises processing the received orientation measurements and the received movement measurements to determine a sequence of positions and orientations of the device during the treatment operation; and the step of comparing comprises comparing the determined sequence of orientations and positions of the device to the normal vectors and respective positions of the normal vectors to determine the location of the device on the surface of the body part during the treatment operation. These embodiments improve the accuracy of the location determined for the device.

In these embodiments, the step of comparing can comprise identifying a sequence of normal vectors in the 3D representation having respective positions and orientations that match the sequence of positions and orientations of the device. In these embodiments, the step of comparing can comprise determining a path taken by the device over the surface of the body part as the respective positions of the normal vectors in the identified sequence of normal vectors. In these embodiments, the step of comparing can comprise determining the location of the device on the surface of the body part as the position associated with a normal vector on the surface of the body part that has a position and orientation that matches a final position and orientation in the sequence of positions and orientations of the device.

In these embodiments, the one or more movement sensors can include an accelerometer, and the step of processing can comprise: processing the plurality of orientation measurements to estimate a direction in which gravity is acting on the device; processing the plurality of the movement measurements using the estimated direction to remove acceleration due to gravity from the plurality of movement measurements; and determining the sequence of positions and orientations of the device during the treatment operation from the received orientation measurements and the plurality of processed movement measurements.

In these embodiments, the method can further comprise: estimating an orientation of the body part relative to the device from the determined sequence of positions and orientations of the device; and rotating the 3D representation of the body part according to the estimated orientation; and the step of comparing comprises comparing the determined sequence of orientations and positions of the device to the normal vectors and respective positions of the normal vectors in the rotated 3D representation to determine the location of the device on the surface of the body part during the treatment operation. These embodiments can improve the accuracy of the location determined for the device by correcting for the orientation body part being different to that in the 3D representation.

In some embodiments, the method further comprises: obtaining an initial image that includes the device and the body part; processing the obtained image to determine an orientation of the device relative to the body part; rotating the 3D representation of the body part according to the determined orientation of the device relative to the body part; and the step of comparing comprises comparing the determined sequence of orientations of the device to the normal vectors and respective positions of the normal vectors in the rotated 3D representation to determine the location of the device on the surface of the body part during the treatment operation. These embodiments provide the advantage that the orientation of the device relative to the body part can be determined at an early stage, enabling the location of the device to be determined earlier in the treatment operation.

In these embodiments, the method can further comprise: obtaining one or more further images during the treatment operation, the one or more further images including the body part; comparing the one or more further images and the initial image to determine an amount of movement and/or change in orientation of the body part during the treatment operation; and, if movement and/or a change in orientation of the body part is determined to occur at a time point during the treatment operation, adjusting the 3D representation of the body part according to the determined amount or movement and/or change in orientation; wherein the step of comparing comprises, for the orientation measurements obtained after the time point, comparing the determined sequence of orientations of the device after the time point to the normal vectors and respective positions of the normal vectors in the adjusted 3D representation to determine the location of the device on the surface of the body part during the treatment operation. These embodiments have the advantage that movements of the body part during the treatment operation can be observed and compensated for.

In some embodiments, the 3D representation of the body part includes normal vectors for respective positions on the surface of part of the body part that is relevant to the treatment operation. In these embodiments, the part of the body part that is relevant to the treatment operation can be determined according to a template or style for the treatment operation. In these embodiments, the step of comparing can comprise comparing the determined sequence of orientations of the device to the normal vectors and respective positions of the normal vectors for part of the body part that is relevant to the treatment operation to determine the location of the device on the surface of the body part during the treatment operation.

In some embodiments, the body part is the face and the treatment operation is a shaving operation. In these embodiments, the 3D representation of the face can include normal vectors for respective positions on the surface of the face that have facial hair.

In some embodiments, the body part is the head and the treatment operation is a hair clipping operation. In these embodiments, the 3D representation of the head can include normal vectors for respective positions on the surface of the head that have hair.

In some embodiments, the step of obtaining the 3D representation comprises processing an image of the body part to generate the 3D representation of the body part. In these embodiments, the image of the body part can be an image of the body part after a previous treatment operation, and processing the image comprises: processing the image to identify one or more parts of the body part treated by the previous treatment operation and/or one or more parts of the body part not treated by the previous treatment operation; and determining normal vectors for respective positions on the surface of one or more parts of the body part that were treated by the previous treatment operation. In alternative embodiments, the step of obtaining the 3D representation can comprise processing first and second images of the body part to generate the 3D representation of the body part, wherein the first image is an image of the body part before a treatment operation and the second image of the body part is an image of the body part after a previous treatment operation; and processing the image comprises: processing the first and second images to identify one or more parts of the body part treated by the previous treatment operation and/or one or more parts of the body part not treated by the previous treatment operation; and determining normal vectors for respective positions on the surface of one or more parts of the body part that were treated by the previous treatment operation.

In some embodiments, the device comprises a treatment portion for contacting the body part and for performing the treatment operation; the step of processing the received orientation measurements comprises: rotating the orientation measurements such that the rotated orientation measurements represent the orientation of the treatment portion; and processing the rotated orientation measurements to determine a sequence of orientations of the treatment portion during the treatment operation; and the step of comparing comprises comparing the determined sequence of orientations of the treatment portion to the normal vectors and respective positions of the normal vectors to determine the location of the device on the surface of the body part during the treatment operation. These embodiments provide the advantage that the accuracy of the location determination is improved as the orientation measurements are corrected to the orientation of the part of the device that is in contact with the surface of the body part. In these embodiments, and where one or more movement sensors are provided, the treatment portion can be spaced a predetermined distance from the one or more movement sensors; and the step of processing can further comprise: correcting the movement measurements using the plurality of orientation measurements and the predetermined distance such that the movement measurements represent the movements of the treatment portion; and processing the corrected movement measurements and rotated orientation measurements to determine a sequence of orientations and positions of the treatment portion during the treatment operation. These embodiments provide the advantage that the accuracy of the location determination is further improved as the movement measurements are also corrected to the position of the part of the device that is in contact with the surface of the body part.

In some embodiments, the method further comprises providing feedback to the subject based on the determined location of the device on the surface of the body part during the treatment operation.

According to a second aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

According to a third aspect, there is provided an apparatus for determining a location of a device on a surface of a body part of a subject that is treated by the device during a treatment operation, wherein the device is for performing the treatment operation on the body part, and wherein the device comprises one or more orientation sensors for measuring the orientation of the device in a reference frame of the device, the apparatus comprising a processing unit configured to: obtain a three dimensional, 3D, representation of the body part, the 3D representation comprising normal vectors for respective positions on the surface of the body part; receive a plurality of orientation measurements from the one or more orientation sensors representing orientation of the device during the treatment operation on the body part; process the received orientation measurements to determine a sequence of orientations of the device during the treatment operation; and compare the determined sequence of orientations of the device to the normal vectors and respective positions of the normal vectors to determine the location of the device on the surface of the body part during the treatment operation. Thus the apparatus provides that the location of a device on the surface of a body part can be determined using one or more orientation sensors in the device itself, without requiring the subject to wear or carry additional sensors on their body or the relevant body part.

Various embodiments of the apparatus are envisaged in which the processing unit is further configured to operate according to any of the embodiments of the first aspect set out above.

According to a fourth aspect, there is provided a system that comprises an apparatus according to the third aspect, or any embodiment thereof and a device for performing a treatment operation on a body part, wherein the device comprises one or more orientation sensors for measuring the orientation of the device in a reference frame of the device.

In some embodiments, the apparatus is comprised in the device. In alternative embodiments, the apparatus is separate from the device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

As noted above, the invention is for determining a location of a device on a surface of a body part of a subject. The surface of the body part may be the skin, or the surface may be clothing worn over the body part (if appropriate for the treatment operation to be performed). The device is for performing a treatment operation on the body part when the device (or a part of the device) is in contact with the surface of the body part. The device can be a hand-held device, i.e. a device that is to be held in a hand of a user. The user of the device may be the person that the treatment operation is to be performed on (i.e. the user is using the device on themselves), or the user of the device can be using the device to perform the treatment operation on another person or an animal. In both cases, the person (or animal) that the treatment operation is performed on is referred to herein as the 'subject'.

A treatment operation could be a personal care operation such as hair removal or hair cutting, including shaving, clipping, electrolysis, plucking, and laser and light therapies (known as photoepilation or Intense Pulsed Light, IPL). Other personal care operations can be include hair growth reduction, treating acne, skin cleansing, massaging the skin, nail treatment, and physiotherapy. In the following description of the invention, references are made to the device being for shaving a subject, particularly shaving the face, and hair clipping, particularly clipping hair on the head, but unless otherwise indicated below, it should be appreciated that the invention is applicable to any type of device that has a treatment portion for performing any type of treatment operation on the surface of a body part.

Figure 1:
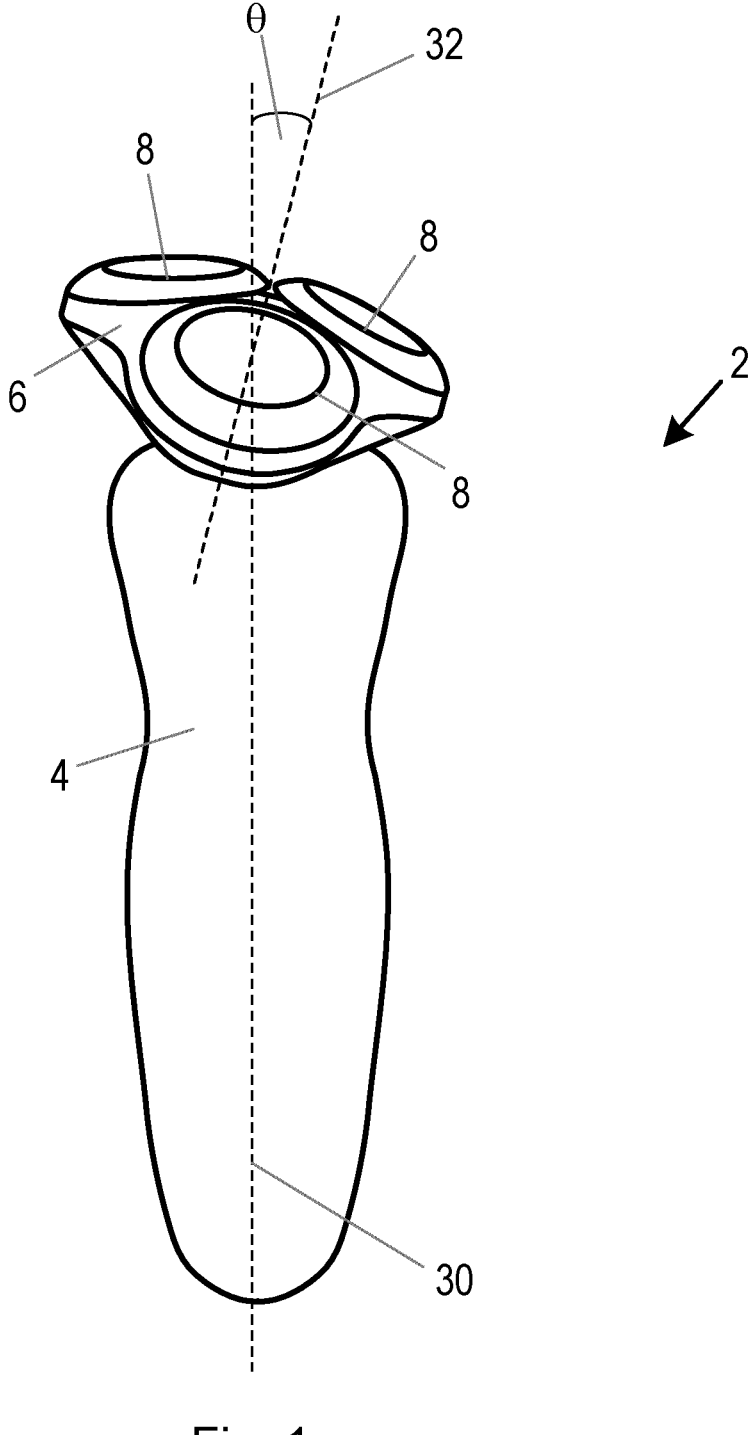
FIG. 1 is an illustration of an exemplary device in the form of a rotary shaver.

FIG. 1 is an illustration of an exemplary device 2 to which the invention can be applied, with the device 2 in the form of a rotary shaver. The rotary shaver comprises a main body 4 that is to be held in a hand of a user and a treatment portion 6 in the form of a shaving portion that includes a plurality of cutting elements 8 for cutting/shaving hair. Each cutting element 8 comprises one or more circular blades (not shown in FIG. 1) that rotate rapidly. Although the treatment portion 6 is shown as including three cutting elements 8 arranged in a triangle (as shown in FIG. 1), it will be appreciated that a rotary shaver can have a different number of cutting elements 8 and/or a different arrangement of cutting elements 8. As noted above the device 2 could be in a different form, for example hair clippers, a photoepilation device, a skin cleansing device, etc.

Figure 2:
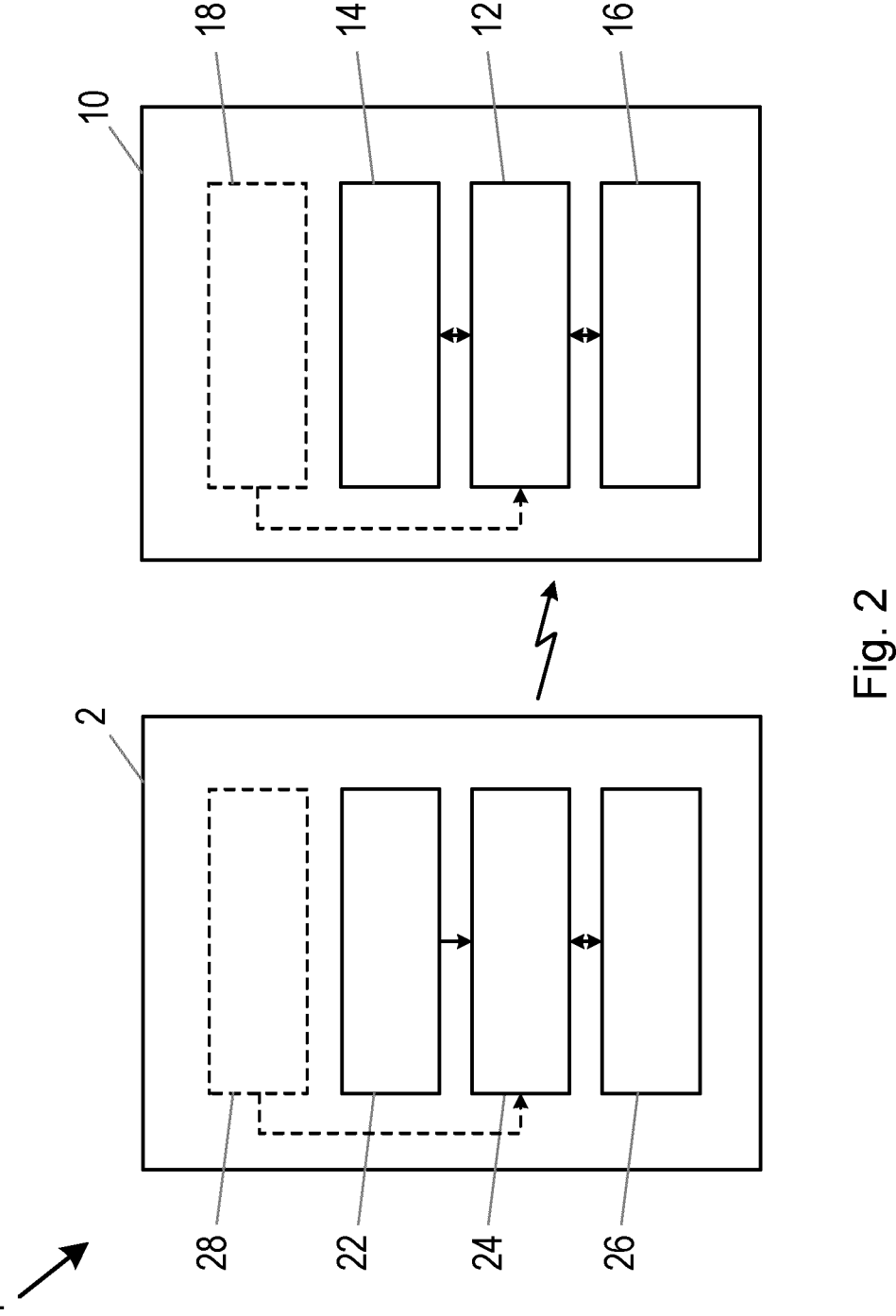
FIG. 2 is a block diagram of an exemplary system comprising a device for performing a treatment operation and an apparatus for determining the location of the device on the surface of a body part according to the invention.

FIG. 2 shows a block diagram of an exemplary apparatus 10 for determining the location of a device 2 on the surface of a body part according to the invention. The apparatus 10 is shown as part of a system 11 that also includes the device 2 (e.g. a rotary shaver as shown in FIG. 1, or hair clippers, a toothbrush, a photoepilation device, etc.). In the embodiments shown in FIG. 2, the apparatus 10 is a separate apparatus to the device 2, and thus the apparatus 10 may be in the form of an electronic device, such as a smart phone, smart watch, tablet, personal digital assistant (PDA), laptop, desktop computer, smart mirror, etc. In other embodiments (not shown in FIG. 2), the apparatus 10, and particularly the functionality according to the invention provided by the apparatus 10, is part of the device 2.

The apparatus 10 comprises a processing unit 12 that generally controls the operation of the apparatus 10 and enables the apparatus 10 to perform the method and techniques described herein. Briefly, the processing unit 12 receives measurements of the orientation of the device during the treatment operation, processes them to determine a sequence of orientations during the treatment operation and determines the location of the device by comparing the sequence to a three-dimensional (3D) representation of the body part being treated, with the 3D representation including normal vectors for respective positions on the surface of the body part.

Thus the processing unit 12 can be configured to receive the orientation measurements from another component of the apparatus 10 and therefore the processing unit 12 can include or comprise one or more input ports or other components for receiving the orientation measurements from the other component. The processing unit 12 can also include or comprise one or more output ports or other components for communicating with other components of the apparatus 10.

The processing unit 12 can be implemented in numerous ways, with software and/or hardware, to perform the various functions described herein. The processing unit 12 may comprise one or more microprocessors or digital signal processors (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The processing unit 12 can comprise or be associated with a memory unit 14. The memory unit 14 can store data, information and/or signals (including orientation measurements and/or the 3D representation) for use by the processing unit 12 in controlling the operation of the apparatus 10 and/or in executing or performing the methods described herein. In some implementations the memory unit 14 stores computer-readable code that can be executed by the processing unit 12 so that the processing unit 12 performs one or more functions, including the methods described herein. In particular embodiments, the program code can be in the form of an application for a smart phone, tablet, laptop or computer. The memory unit 14 can comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM) and electrically erasable PROM (EEPROM), and the memory unit can be implemented in the form of a memory chip, an optical disk (such as a compact disc (CD), a digital versatile disc (DVD) or a Blu-Ray disc), a hard disk, a tape storage solution, or a solid state device, including a memory stick, a solid state drive (SSD), a memory card, etc.

In the embodiment shown in FIG. 2, as the apparatus 10 is separate from the device 2, the apparatus 10 also includes interface circuitry 16 to enable the apparatus 10 to receive the orientation measurements from the device 2. The interface circuitry 16 in the apparatus 10 enables a data connection to and/or data exchange with other devices, including any one or more of device 2, servers, databases, user devices, and sensors. The connection to the device 2 (or any other device) may be direct or indirect (e.g. via the Internet), and thus the interface circuitry 16 can enable a connection between the apparatus 10 and a network, or directly between the apparatus 10 and another device (such as device 2), via any desirable wired or wireless communication protocol. For example, the interface circuitry 16 can operate using WiFi, Bluetooth, Zigbee, or any cellular communication protocol (including but not limited to Global System for Mobile Communications (GSM), Universal Mobile Telecommunications System (UMTS), Long Term Evolution (LTE), LTE-Advanced, etc.). In the case of a wireless connection, the interface circuitry 16 (and thus apparatus 10) may include one or more suitable antennas for transmitting/receiving over a transmission medium (e.g. the air). Alternatively, in the case of a wireless connection, the interface circuitry 16 may include means (e.g. a connector or plug) to enable the interface circuitry 16 to be connected to one or more suitable antennas external to the apparatus 10 for transmitting/receiving over a transmission medium (e.g. the air). The interface circuitry 16 is connected to the processing unit 12.

Although not shown in FIG. 2, the apparatus 10 may comprise one or more user interface components that includes one or more components that enables a user of apparatus 10 to input information, data and/or commands into the apparatus 10, and/or enables the apparatus 10 to output information or data to the user of the apparatus 10. The user interface can comprise any suitable input component(s), including but not limited to a keyboard, keypad, one or more buttons, switches or dials, a mouse, a track pad, a touchscreen, a stylus, a camera, a microphone, etc., and the user interface can comprise any suitable output component(s), including but not limited to a display unit or display screen, one or more lights or light elements, one or more loudspeakers, a vibrating element, etc.

It will be appreciated that a practical implementation of an apparatus 10 may include additional components to those shown in FIG. 2. For example the apparatus 10 may also include a power supply, such as a battery, or components for enabling the apparatus 10 to be connected to a mains power supply.

In some embodiments, as described further below, the system 12 can include an imaging unit 18 that is for capturing or obtaining images. In particular, the imaging unit 18 can be used to capture or obtain images of the body part to be treated, and also, at least at the start of the treatment operation, the device 2. As such, the imaging unit 18 can be separate from the device 2. Thus, the imaging unit 18 can be part of the apparatus 10 (in embodiments where the apparatus 10 is separate from the device 2, e.g. as shown in FIG. 2), or the imaging unit 18 can be separate from the apparatus 10. In some embodiments, the imaging unit 18 can be a camera in a smart phone, tablet, laptop computer or smart mirror. In embodiments where the image or images obtained by the imaging unit 18 are used to determine the 3D representation of the body part, the imaging unit 18 may also be configured to obtain an image or images that include depth information (i.e. information about the distance, or difference in distance, of parts of the image from the imaging unit 18), or that enable such depth information to be determined from the obtained images.

The imaging unit 18 may include any suitable component for capturing an image, for example a charge-coupled device (CCD) and one or more lenses and/or mirrors. In some embodiments, the imaging unit 18 is a camera, such as a digital camera. The device 2 shown in FIG. 2 includes an orientation sensor 22 for measuring the orientation of the device 2, a device processing unit 24 and interface circuitry 26. The interface circuitry 26 is for transmitting signals from the device 2 to the apparatus 10, including the orientation measurements. The interface circuitry 26 can be implemented according to any of the options outlined above for the interface circuitry 16 in the apparatus 10 in order to communicate with the interface circuitry 16 in the apparatus 10.

The orientation sensor 22 is integral with or otherwise fixed to the device 2 so that the orientation sensor 22 directly measures the orientation of the device 2 in a reference frame of the device 2. The orientation sensor 22 can be any type of sensor, or combination of sensors, that can measure the orientation of the device 2. For example, the orientation sensor 22 can be a gyroscope, and/or an accelerometer. In the case of an accelerometer, the acceleration measurements can be processed to determine a direction in which gravity is acting in the reference frame of the orientation sensor 22 (and thus in the reference frame of the device 2), and this can provide an indication of the orientation of the device 2. The orientation sensor 22 can output orientation measurements in the form of a continuous signal (or signals) or a time series of measurement samples according to a sampling rate of the orientation sensor 22. If a gyroscope and an accelerometer are both used to measure orientation, the acceleration measurements from the accelerometer and rotation speed measurements from the gyroscope can be processed to determine a single orientation estimate for the device 2. For example, a complementary filter can be used to transform the accelerometer measurements and the gyroscope measurements to a reliable orientation estimate. Alternatively a Kalman filter can be used.

The device processing unit 24 generally controls the operation of the device 2, for example activating and deactivating a treatment portion to effect a treatment operation. The device processing unit 24 can be implemented in numerous ways according to any of the options outlined above for the processing unit 12 in the apparatus 10.

The device processing unit 24 can be connected to the orientation sensor 22 and receives measurements of the orientation of the device 2 from the orientation sensor 22, for example via an input port to the device processing unit 24. In some embodiments, the device processing unit 24 may output the measurements (e.g. raw orientation data) of the orientation to the interface circuitry 26 for transmission to the apparatus 10 for subsequent processing. In alternative embodiments, the device processing unit 24 can perform some initial processing on the measurements, for example to reduce noise or other artefacts, and the device processing unit 24 outputs the processed orientation measurements to the interface circuitry 26 for transmission to the apparatus 10 for subsequent processing.

In some embodiments, the device 2 can also include one or more movement sensors 28 for measuring the movement or motion of the device 2 during use of the device 2 by the user. The movement sensor(s) 28 can output movement measurements in the form of a continuous signal (or signals) or a time series of measurement samples according to a sampling rate of the movement sensor 28. The movement sensor(s) 28 are preferably integral with or otherwise fixed to the device 2 so that the movement sensor(s) 28 directly measure the movements of the device 2. In some embodiments, the movement sensor 28 is an accelerometer, for example that measures acceleration along three orthogonal axes (i.e. in three dimensions). As noted below, to determine the movement of the device 2 from acceleration measurements, a direction of gravitational acceleration is determined from the orientation measurements, acceleration due to gravity is subtracted from the acceleration measurements, and then double integration and one or more filters are used to determine the movement of the device 2. Alternatively or in addition, the movement sensor 28 can comprise a force sensor, for example for measuring movement of a part of the device 2, such as treatment portion 6 relative to the main body 4, a gyroscope, a satellite positioning system (SPS) receiver, or an indoor localization system.

In some implementations of FIG. 2, the apparatus 10 is a smart phone, tablet or smart mirror that is executing an application that provides the functionality according to the invention.

In embodiments where the apparatus 10, or the functionality of the apparatus 10, is part of the device 2, the device processing unit 24 can implement the functions of the apparatus processing unit 12 to determine the location of the device 2 according to the invention.

It will be appreciated that a practical implementation of device 2 may include additional components to those shown in FIG. 2. For example the device 2 may also include a power supply, such as a battery, or components for enabling the device 2 to be connected to a mains power supply. The device 2 will also include a treatment portion for performing the treatment operation. For example, the treatment portion can be a cutting portion or a shaving portion that includes one or more cutting elements 8.

As noted above, to determine the location of the device 2 on the surface of a body part of a subject that is being treated by the device 2 in a treatment operation, the invention provides that measurements of the orientation of the device 2 during the treatment operation are obtained, the measurements are processed to determine a sequence of orientations during the treatment operation, and the location of the device is determined by comparing the sequence to a 3D representation of the body part being treated. In some embodiments, measurements of the movements of the device 2 are also obtained, a sequence of orientations and movements of the device 2 determined, and this sequence is compared to the 3D representation.

Figure 3:
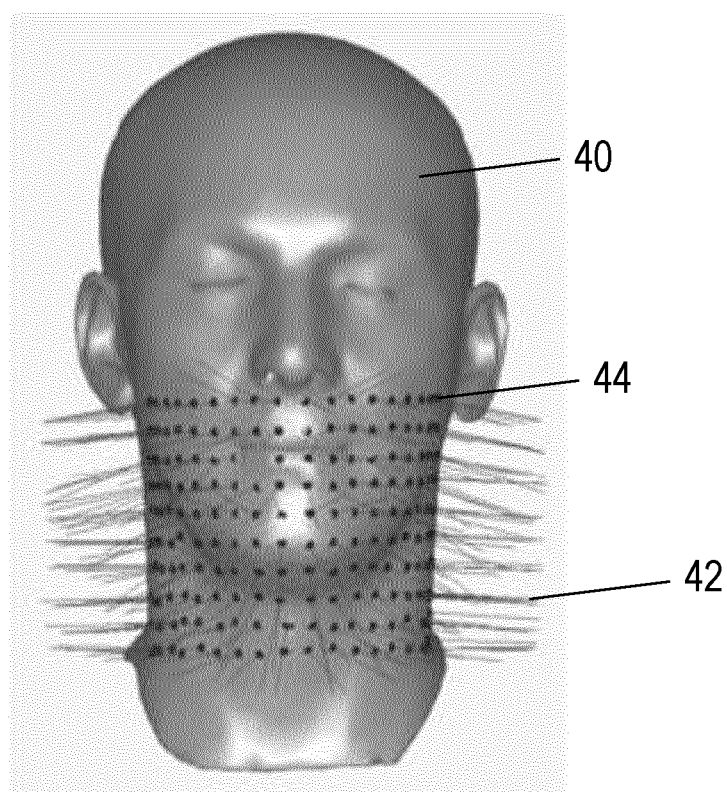
FIG. 3 is an illustration of an exemplary 3D representation.

Thus the invention makes use of a 3D representation of the body part, which includes normal vectors for respective positions on the surface of the body part. Thus, for each of a plurality of positions on the surface of the body part, the 3D representation includes a normal vector (i.e. a vector that is perpendicular to the surface at that position). An exemplary 3D representation of a subject's head 40 is shown in FIG. 3. Thus, the 3D representation comprises a plurality of vectors 42 that are normal to a respective position 44 on the surface of the head. The sequence of orientations of the device 2 during the treatment operation is compared to the 3D representation to identify a path across the 3D representation where the orientation of the normal vectors along the path match or fit (or provide a best possible match or fit) with the sequence of orientations of the device 2. The positions on the surface of the body part of the normal vectors along the path provide the location of the device 2 during the treatment operation. In some embodiments, the comparison is performed after the treatment operation is completed, in which case the path can provide an indication of, for example, the parts of the body part that have been treated. In other embodiments, the comparison can be performed in real-time or near real-time as the orientation measurements are obtained, and the comparison can provide the current location of the device 2 on the surface of the body part (i.e. the current location of the device 2 corresponds to the position of the last or final normal vector in the path).

Figure 4:
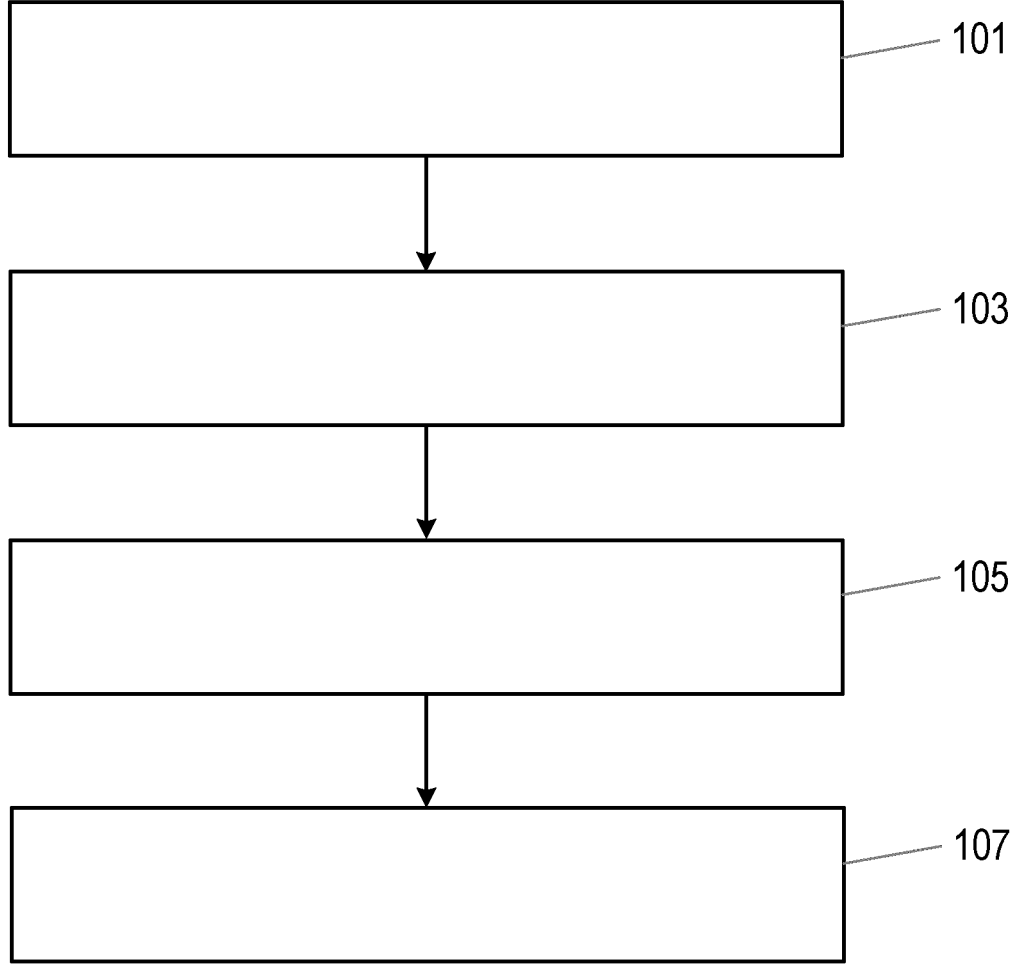
FIG. 4 is a flow chart illustrating an exemplary method according to the invention.

The flow chart in FIG. 4 illustrates an exemplary method performed by the apparatus 10 according to the techniques described herein. One or more of the steps of the method can be performed by the processing unit 12 in the apparatus 10, in conjunction with the interface circuitry 16 (if present) and memory unit 14, as appropriate. The processing unit 12 may perform the one or more steps in response to executing computer program code, that can be stored on a computer readable medium, such as, for example, the memory unit 14. During a treatment operation (e.g. when the treatment portion are activated/operational and the device 2 is being moved by a user), the orientation sensor 22 measures the orientation of the device 2.

In a first step of the method, step 101, a 3D representation of the body part to be (or being) treated is obtained. This step can comprise retrieving or receiving a previously-determined 3D representation, for example from memory unit 14. Alternatively, this step can comprise determining the 3D representation of the body part. As described in more detail below, one or more images (e.g. photographs) can be processed to determine the 3D representation. As noted above, an exemplary 3D representation is shown in FIG. 3.

In step 103, a plurality of measurements representing the orientation of the device 2 during the treatment operation are received by the processing unit 12. The measurements can be received by the processing unit 12 directly from the orientation sensor 22 (for example where the processing unit 12 is part of the device 2), or they can be received by the processing unit 12 via the interface circuitry 16. In order to determine the location of the device 2 on the surface of the body part in real-time or near real-time, measurements of orientation are obtained by the orientation sensor 22 continuously or semi-continuously (e.g. according to a sampling rate of the orientation sensor 22) and provided to the processing unit 12 continuously or semi-continuously (i.e. as the measurements are obtained by the orientation sensor 22). In preferred embodiments the orientation sensor 22 is a gyroscope and/or an accelerometer.

In step 105, the received orientation measurements are processed to determine a sequence of orientations of the device 2 during the treatment operation.

Next, in step 107, the location of the device is determined by comparing the sequence of orientations of the device to the 3D representation obtained in step 101. In particular, the sequence of orientations is compared to the normal vectors to identify a sequence of normal vectors in the 3D representation (otherwise referred to as a path) where the orientation of the normal vectors in the sequence match or fit, or provide a best possible match or fit compared to other possible paths across the body part, the sequence of orientations of the device 2.

In some embodiments, step 107 can be performed using Hidden Markov Models, Conditional Random Fields or Recurrent Neural Networks. As is known, a Hidden Markov Model estimates a sequence of 'states' that best matches 'input data' to 'emissions' of 'states'. Thus, in the context of step 107, a Hidden Markov Model can be used to estimate a sequence of candidate positions on the surface of the body part that best match the input sequence of orientations of the device 2 to normal vectors of positions on the body part. In using a Hidden Markov Model, it is assumed that the next location of the device 2 on the body part is only dependent on the current location of the device 2 on the body part, and it is assumed that the probability of the device 2 moving to the next location is independent of time.

The positions on the surface of the body part of the normal vectors along the path correspond to the location of the device 2 on the surface of the body part at some point during the treatment operation. If at the time that step 107 is performed the treatment operation is still ongoing and the orientation measurements are received in step 103 in real-time or near real time, the current location of the device 2 on the surface of the body part corresponds to the position of the last (final) normal vector in the path.

It will be appreciated that for the approach in step 107 to be successful, the 3D representation and path taken by the device 2 should be sufficiently curved so that it is possible to match the path and 3D representation with some degree of reliability (i.e. there should be a single or a small set of possibilities to match the sequence of orientations of the device 2 to the 3D representation).

Figure 5:
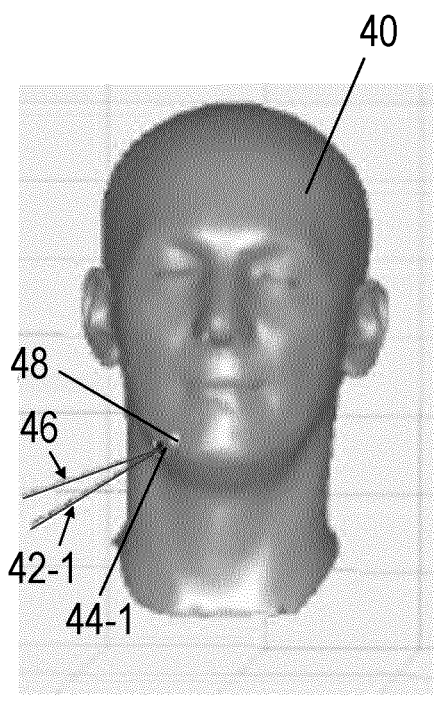
FIGS. 5 and 6 illustrate how the 3D representation is used to determine the location of the device.
Figure 6:
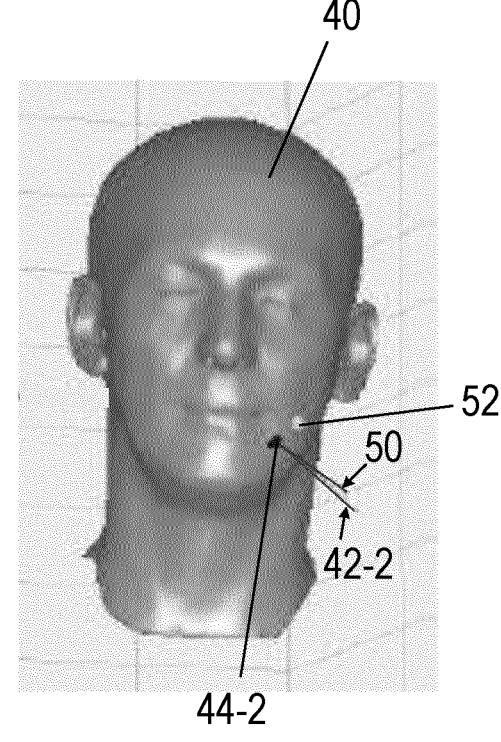

FIGS. 5 and 6 illustrate how the 3D representation can be used in step 107 to determine the location of the device 2 for two different device locations. For ease of illustration FIGS. 5 and 6 only show a current orientation of the device 2 and a corresponding normal vector 42 in the 3D representation, but it will be appreciated that typically a sequence of orientations is required in order to provide a reliable match of the orientation sequence to a possible path on the body part. Thus, FIG. 5 shows a vector 46 representing the orientation of the device 2 at a particular time point, and a normal vector 42-1 that has been identified that has an orientation approximately matching that of vector 46. The normal vector 42-1 is for a position 44-1 on the surface of the head 40, and therefore the location of the device 2 is given as position 44-1, which is the right side of the chin. For comparison, point 48 corresponds to the actual location of device 2 on the surface of the head 40 when the orientation measurement corresponding to vector 46 was obtained. FIG. 6 shows another vector 50 representing the orientation of the device 2 at another time point, and a normal vector 42-2 that has been identified that has an orientation approximately matching that of vector 50. The normal vector 42-2 is for a position 44-2 on the surface of the head 40, and therefore the location of the device 2 is given as position 44-2, which is the left cheek. For comparison, point 52 corresponds to the actual location of device 2 on the surface of the head 40 when the orientation measurement corresponding to vector 50 was obtained.

In some embodiments, steps 103-107 can be repeated for further orientation measurements of the device 2 to provide an updated location of the device 2. It will be appreciated that in repeating step 105, the sequence of orientations of the device 2 can be determined from the further orientation measurements and some or all of the orientation measurements received in the first occurrence of step 103.

As noted above, in some embodiments the device 2 also includes a movement sensor 28 for measuring the movements of the device 2. In these embodiments, the method further comprises a step of receiving a plurality of movement measurements from the movement sensor 28, with the movement measurements representing the movement of the device 2 during the treatment operation on the body part. The received movement measurements correspond to generally the same time period as the orientation measurements received in step 103 (i.e. at least some the movement measurements relate to the same time period as the orientation measurements received in step 103. The movement measurements indicate the movement or motion of the device 2 in the reference frame of the device 2. At this stage, the absolute position of the device 2 (e.g. in a global frame of reference), or the position of the device 2 relative to the body part, is not known. In step 105 a sequence of positions and orientations of the device 2 is determined from the received orientation measurements and received position measurements. The sequence represents the orientations of the device 2 during the treatment operation, and the positions of the device 2 (in the reference frame of the device 2) or the changes in position of the device 2 during the treatment operation that those orientations or changes in orientation occurred. Put another way, the sequence of positions indicates a path in the reference frame of the device 2 that the device 2 has moved during the treatment operation, and the sequence of orientations indicates the orientations of the device 2 along that path. In step 107 the sequence of positions and orientations are compared to the normal vectors in the 3D representation. Similar to the orientation-only embodiment, the comparison in step 107 aims to identify a sequence of normal vectors in the 3D representation where the orientation and positional spacing of the normal vectors in the sequence match or fit, or provide a best possible match or fit (compared to other possible paths across the body part), the sequence of orientations and corresponding positions of the device 2. As before, the positions on the surface of the body part of the normal vectors along the path correspond to the location of the device 2 on the surface of the body part at some point during the treatment operation. If at the time that step 107 is performed the treatment operation is still ongoing and the orientation measurements and movement measurements are received in real-time or near real time, the current location of the device 2 on the surface of the body part corresponds to the position of the last (final) normal vector in the path.

In some embodiments, step 105 can include some processing of the movement measurements to remove acceleration due to gravity. In particular, where the movement sensor 28 is an accelerometer, the movement (acceleration) measurements will be a series of acceleration vectors that each include a component of acceleration due to gravity. In this case, the plurality of orientation measurements, which can be provided by a gyroscope, can be processed to estimate a direction in which gravity is acting on the device 2 through the treatment operation. That is, the orientation of the device 2 in a global frame of reference is determined at each sampling instant from the orientation measurements. Those skilled in the art will be aware of various techniques for determining the orientation of the device 2 from gyroscope and/or acceleration measurements, for example using complementary filters or Kalman filters. Acceleration due to gravity (~9.81 ms$^{-2}$) is then subtracted from each of the acceleration vectors according to the estimated direction of gravity at that sampling instant. This provides a series of movement measurements that have been corrected for gravity. The sequence of positions and orientations of the device 2 during the treatment operation is then determined from the received orientation measurements and the movement measurements that have been corrected for gravity. In some embodiments, each position in the sequence can be determined by double integration with respect to time of each movement measurement. In some embodiments, filtering and/or smoothing can be used to improve the estimated positions, for example by ensuring that the average acceleration after gravity is removed is 0, and filtering the estimated speed after the first integration to ensure that the average speed is 0. The filtering for estimating speed can be a Savitzky-Golay filter followed by a moving average filter.

It will be appreciated that the orientation measurements and movement measurements (if obtained), will be obtained by an orientation sensor 22 and movement sensor 28 that are fixed at a particular position inside the device 2. For example, the orientation sensor 22 and movement sensor 28 can be inside the main body 4 of the device 2 shown in FIG. 1, and thus the orientation measurements represent orientation of the main body 4, for example with respect to a measurement axis 30 that runs through the main body 4. However, the physical construction of the device 2 may be such that the treatment portion 6 is not aligned with the measurement axis 30 of the orientation sensor 22, for example as shown in the shaver of FIG. 1. Here, axis 32 is perpendicular to the plane of the treatment portion 6 (which corresponds to the plane of the surface of the body part at the point where the treatment portion 6 contacts the body part), and is at an angle θ with respect to the measurement axis 30 due to the construction of the device 2. To make the comparison between orientations and the normal vectors of the 3D representation easier (and more accurate), the orientation measurements obtained by the orientation sensor 22 should be rotated or corrected into the frame of reference of the treatment portion 6 of the device 2, represented by axis 32 (which is offset by angle θ from the measurement frame of reference represented by measurement axis 30).

Angle θ will be a known parameter of the device 2 (e.g. it is determined during a design or manufacturing stage for the device 2), and thus step 105 can comprise rotating the orientation measurements obtained by the orientation sensor 22 into the reference frame of the treatment portion 6 (e.g.

rotating the orientation measurements according to angle θ). The rotated orientation measurements can be used to determine the sequence of orientations, and thus the sequence of orientations represent the orientations of the treatment portion 6 during the treatment operation.

Likewise, the movement sensor 28 will measure the movements at the position of the movement sensor 28 inside the main body 4, which is spaced from the treatment portion 6 by a predetermined distance (which is determined by the design of the device 2). Therefore, the movement measurements from the movement sensor 28 can be corrected so that they represent the movements of the treatment portion 6, based on the physical construction of the device 2 (the predetermined distance) and the orientation measurements. The corrected movement measurements and the rotated orientation measurements can be used to determine the sequence of orientations and positions of the treatment portion 6 during the treatment operation.

As noted above, step 101 can comprise determining the 3D representation of the body part, and the 3D representation can be determined from one or more images (e.g. photographs) of the body part. The one or more images can be obtained using the imaging unit 18, if it is present in the apparatus 10, or they can be obtained by a different apparatus or device, for example using a camera in a smartphone, and provided to the processing unit 12. The 3D representation can be determined during or before the first use of the device 2 by the user, or on the particular body part to be treated. Once the 3D representation is determined, subsequent iterations of step 101 (i.e. when the device 2 is to be used for another treatment operation on the body part) can comprise retrieving the 3D representation from a memory, e.g. from memory unit 14.

Based on the image of the body part (e.g. the face, head, arm, chest, leg, etc.), the 3D representation of the body part is generated. Those skilled in the art will be aware of techniques that can be used to generate a 3D representation. One such technique is described in WO 2017/085075. In some embodiments, information about the subject can also be provided and used to generate the 3D representation. The information can include, for example, height, weight, age, gender, neck circumference, etc.

In some embodiments, the generated 3D representation includes normal vectors at least for parts of the body part that are relevant to the treatment operation to be performed. The 3D representation can also be referred to as a 3D parametric model. For example, in the case of a shaving operation for a head or face, the 3D representation may include normal vectors for at least a 'beard area' on the face and neck, i.e. the parts of the face and neck that facial hair grows on. In some embodiments, the 3D representation only includes normal vectors for the part(s) of the body part that are relevant to the treatment operation.

The part(s) of the body part relevant to the treatment operation can be identified automatically, for example by processing the image(s) in view of the treatment operation to be performed to identify the relevant body part(s). Alternatively the user can provide an input indicating the relevant parts. In some embodiments, where the treatment operation is to produce a particular style, for example a beard with a particular shape, or a hair cut in a particular style, the relevant part(s) of the body part(s) can correspond to the part(s) to be treated during the treatment operation to achieve that style. The style to be produced can be determined from an image that shows the body part with the style, in which case image analysis can identify the style (e.g. the part(s) of the body part that have facial hair, and/or hair of a particular length). The image showing the style can be an image of the subject after they have performed a treatment operation to produce the style, or an image of a different subject showing the style that the subject wants to achieve. In some embodiments, the after-treatment image can be compared to an image obtained before the treatment in order to identify the style from the differences between the images. Alternatively the subject can select a style from a plurality of templates that define respective styles.

In some embodiments, the areas of the body part that are relevant to the treatment operation can be considered as a spatial probability map, i.e. the parts or areas of the body part that are probable or feasible locations for the device 2 during the treatment operation. The spatial probability map can be determined from the relevant part(s) of the body part to be treated identified above. For example, an expected shaving area (e.g. neck, cheeks, chin, and upper lip) on the face or head can be determined. In embodiments in which an image of the desired shaving or hair cutting style is analyzed, a spatial probability map can be determined based on the hair density detected in the image. The device 2 is more likely to be located on areas of the face on which hair grows but that, in the image, do not have hair. On the other hand, if the image is an image of the subject before the shaving or hair cutting operation, the device 2 is more likely to be located on areas of the face or head on which hair is present, and the spatial probability map can be determined accordingly.

Thus, the spatial probability map can be used in step 107 to improve the reliability of the detection of the location of the device 2. In particular, the comparison in step 107 of the orientations to the normal vectors may provide multiple possible paths for the device 2 over the surface, and the information in the spatial probability map can be used to determine which of those paths is the most likely for the device 2.

It will be appreciated that the reliability of comparing step 107 in determining the location of the device 2 on the surface of the body part will depend on the initial orientation of the body part and how still (motionless) the body part is during the treatment operation. If the body part is not oriented in the same way as in the 3D representation (for example the subject has tilted their head back, whereas the 3D representation has the head facing forwards), then step 107 may find an incorrect match between the sequence of orientations (and movements, if obtained) and the normal vectors. Likewise, if the body part moves during the treatment operation (either or both of a translational/linear movement and rotation), this may lead to an incorrect match between the sequence of orientations and movements.

Thus, in some embodiments, the orientation measurements and/or movement measurements are analyzed to estimate the orientation of the body part relative to the device 2. This estimation can be made after rotating the orientation measurements into the reference frame of the treatment portion 6.

In embodiments where orientation measurements are obtained for a complete treatment operation, or at least for a sufficient amount of time before the previous locations of the device 2 are determined, the orientation of the body part can be estimated, with the assumption that the orientation of the body part did not change during the treatment operation. In particular, after determining candidate locations of the device 2 on the body part by matching the sequence of orientations of the device 2 to the normal vectors, a single orientation of the body part can be estimated as that which provides the minimum total sum of the angles between the normal vectors for the candidate locations and the sequence of orientations.

In embodiments where orientation and movement measurements are obtained, if in step 107 the sequence of orientation measurements and movement measurements does not provide a good enough match (or any match) with the 3D representation, then it can be determined that it is likely that the body part has moved during the treatment operation. This mismatch can then be used to estimate the most likely movement of the body part. In particular, a translational movement of the device 2 indicated by the movement measurements should match the distance between successive locations on the body part. If the translational movement estimates are correct, and there is no match, then the body part has moved. Therefore, in step 107 a sequence of body-part locations are identified that have normals equal to the sequence of device orientations, and sequence of body-part rotations are identified that lead to translations/movements equal to the measured translations/ movements of the device 2. This can be done using a Hidden Markov Model, where the 'states' of the model are the start state, end state, all combinations of body part positions and orientations (referred to as position/orientation states), pairs of adjacent position/orientation states (referred to as pair states), and transitions from body part/orientation state to pair state to body part/orientation state, the 'emissions' of the model for the position/orientation state is the normal vector of the body part position at a given orientation and for a pair state the (e.g. Euclidean) distance, and the 'input data' is the device orientation and translation/movement since the last measurement sample. In this embodiment, it is assumed that the trajectory of the device 2 on the body part and the rotation of the body part are smooth, the main movements are movements of the device 2, not movements of the body part, the device 2 is positioned in the appropriate area on the body part for the treatment operation, the body part only rotates (i.e. it does not translate), and acceleration and speed of the body part are both 0 on average (e.g. the subject is not walking).

In the above embodiments, as the initial orientation of the body part (i.e. the orientation at the start of the treatment operation) is unknown, a relatively large number of orientation measurements (and movement measurements, if obtained) are required before it is possible to reliably determine the location of the device (even where the body part does not move or rotate during the treatment operation). The position of the device 2 relative to the body part is also unknown at the start of the treatment operation. Therefore, in some embodiments, the imaging unit 18 is used to obtain one or more images at (or before) the start of the treatment operation, and this/these images are analyzed to determine the orientation of the body part and/or the orientation of the device 2 at the start of the treatment operation. This initial orientation information can be used to set the orientation of the device 2 relative to the body part, and to correct the orientation of the 3D representation before the comparing in step 107.

Thus, at or before the start of the treatment operation the apparatus 10 (or other device or apparatus that includes the imaging unit 18) is arranged so that it can view the body part to be treated. As noted above, in some embodiments, the imaging unit 18 can be the camera in a smart phone or tablet, for example a front-facing camera so that the user or subject can view the image(s) on the display screen of the smart phone or tablet while the treatment operation is performed. The user can also be required to, at or before the start of the treatment operation, position the device 2 so that it is also visible in the image(s) with the body part, and the obtained image(s) can be analyzed to determine the orientation of the device 2 relative to the body part. Those skilled in the art will be aware of various image analysis techniques that can be used to analyze image(s) to identify body parts. For example, skeleton recognition techniques can be used, and/ or feature identification (e.g. that identify faces or facial features such as eyes, nose and mouth). After this initial positioning of the device 2 and 'calibration' of the relative orientations, the device 2 can be used to perform the treatment operation, and it is not required for the device 2 to remain in the field of view of the imaging unit 18.

In embodiments where images or a video sequence are obtained during the treatment operation, the subject should keep the body part in the field of view of the imaging unit 18 so that the orientation and position of the body part can be monitored during the treatment operation. In particular, the image(s) or video are analyzed to identify the body part and the orientation of the body part, and this is compared to the orientation of the body part in the image(s) obtained at or before the start of the treatment operation to determine if the body part has moved (in position or orientation). If the body part has moved during the treatment operation, then the 3D representation can be corrected for those rotations and/or movements. In some embodiments, instructions to the subject to keep their body part as still as possible (or at least in the field of view) can be provided to the subject, for example as text on the display screen or as an audible message.

It will be appreciated that although the device 2 should be visible in the obtained image(s) at the start of the treatment operation in order to determine the relative orientation of the device 2 and the body part, it is possible that the device 2 may no longer be visible in the image(s) or video during part of the treatment operation (e.g. when shaving or clipping the other side of the subject's head). Provided that the body part remains visible in the image(s) or video, changes in the orientation of the body part can be identified and the 3D representation rotated accordingly.

In any of the above embodiments, once the location of the device 2 on the body part has been determined, feedback can be provided to the subject based on the determined location. The feedback that is provided can depend on whether the location is determined in real-time or near real-time, at the end of the treatment operation or after a substantial portion of the treatment operation (i.e. a portion long enough that enables the comparison in step 107 to reliably determine the location of the device 2). If the location is determined in real-time or near real-time, the feedback can include guidance or instructions to the user on how to move or use the device 2 to achieve a particular style and/or reduce skin damage or irritation. If the locations of the device 2 during the treatment operation are determined once the treatment operation is complete or after a substantial portion of the treatment operation, the feedback can include information about the performance of the user in completing the treatment operation, such as efficiency, smoothness of movement, covering the surface of the body part evenly, speed of movement, correctness of movement (e.g. long strokes instead of circular movements (or vice versa)), etc.

Also in any of the above embodiments where the location is determined in real-time or near real-time, once the location of the device 2 on the body part has been determined, one or more operational parameters of the device 2 can be adjusted or changed based on the location. For example, if it is determined that the device 2 is at a location on the face where the beard should not be shaved (e.g. according to a beard style selected by the subject or user at the start of the treatment operation), the cutting elements 8 can be deactivated or retracted so that the beard is not shaved at that location. As another example, if it is determined that the device 2 is at a location on the head where the hair should be cut to a shorter length (e.g. according to a hair style selected by the subject or user at the start of the treatment operation), the cutting elements 8 or another part of the device 2 (e.g. a comb) can be adjusted to provide the correct cutting length at that location.

Thus, according to the techniques described above, it is possible to determine the location of a device 2 on the surface of a body part using one or more sensors in the device itself, without requiring the subject to wear or carry additional sensors on their body or the relevant body part.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of providing guidance regarding orientation of a hand-held device on a subject during a treatment operation based on a location of the device on a surface of a body part of the subject during the treatment operation using the device, wherein the device comprises one or more orientation sensors for measuring orientation of the device in a reference frame of the device, the method comprising:

obtaining a three dimensional (3D) representation of the body part, the 3D representation comprising normal vectors for respective positions on the surface of the body part;

receiving a plurality of orientation measurements from the one or more orientation sensors representing orientations of the device during the treatment operation on the body part;

determining in real-time or near real-time a sequence of orientations of the device during the treatment operation based on the plurality of orientation measurements; and determining in real-time or near real-time the location of the device on the surface of the body part during the treatment operation by comparing the sequence of orientations of the device to the normal vectors and the respective positions of the normal vectors; and providing feedback to a user of the device based on the determined location of the device on the surface of the body part during the treatment operation, wherein the feedback comprises guidance or instructions to the user on moving or using the device on the surface of the body part of the subject.

2. The method of claim 1, wherein the comparing comprises identifying a sequence of normal vectors in the 3D representation having respective orientations that match the sequence of orientations of the device.

3. The method of claim 1, wherein the comparing comprises determining the location of the device on the surface of the body part as a position associated with a normal vector on the surface of the body part that has an orientation that matches a final orientation in the sequence of orientations of the device.

4. The method of claim 1, further comprising:

receiving a plurality of movement measurements from one or more movement sensors of the device representing movement of the device during the treatment operation on the body part; and determining a sequence of positions of the device during the treatment operation based on the plurality of received movement measurements, wherein the sequence of positions indicates a path in a reference frame of the device that the device has moved during the treatment operation, and wherein the comparing comprises comparing the sequence of orientations and the sequence of positions of the device to the normal vectors and the respective positions of the normal vectors to determine the location of the device on the surface of the body part during the treatment operation.

5. The method of claim 4, wherein the comparing further comprises identifying a sequence of normal vectors in the 3D representation having respective positions and orientations that match the sequence of positions and the sequence of orientations of the device, respectively.

6. The method of claim 4, wherein the comparing further comprises determining the location of the device on the surface of the body part as a position associated with a normal vector on the surface of the body part that has a position and orientation that matches a final position in the sequence of positions of the device and a final orientation in the sequence of orientations of the device.

7. The method of claim 4, further comprising:

estimating an orientation of the body part relative to the device from the sequence of positions and the sequence of orientations of the device; and rotating the 3D representation of the body part according to the estimated orientation, wherein the comparing further comprises comparing the sequence of orientations and the sequence of positions of the device to the normal vectors and respective positions of the normal vectors in the rotated 3D representation to determine the location of the device on the surface of the body part during the treatment operation.

8. The method of claim 1, further comprising:

obtaining an initial image that includes the device and the body part;

determining an orientation of the device relative to the body part using the initial image; and rotating the 3D representation of the body part according to the orientation of the device relative to the body part, wherein the comparing comprises comparing the sequence of orientations of the device to the normal vectors and respective positions of the normal vectors in the rotated 3D representation to determine the location of the device on the surface of the body part during the treatment operation.

9. The method of claim 8, further comprising:

obtaining one or more further images during the treatment operation, the one or more further images including the body part;

comparing the one or more further images and the initial image to determine an amount of movement and/or change in orientation of the body part during the treatment operation; and when the amount of movement and/or change in orientation of the body part is determined to occur at a time point during the treatment operation, adjusting the 3D representation of the body part according to the amount or movement and/or change in orientation, wherein the comparing further comprises, for the orientation measurements obtained after the time point, comparing the sequence of orientations of the device after the time point to the normal vectors and respective positions of the normal vectors in the adjusted 3D representation to determine the location of the device on the surface of the body part during the treatment operation.

10. The method of claim 1, wherein the device comprises a treatment portion for contacting the body part and for performing the treatment operation;

wherein the determining comprises:

rotating the orientation measurements such that the rotated orientation measurements represent an orientation of the treatment portion; and determining a sequence of orientations of the treatment portion during the treatment operation using the rotated orientation measurements; and wherein the comparing comprises comparing the sequence of orientations of the treatment portion to the normal vectors and respective positions of the normal vectors to determine the location of the device on the surface of the body part during the treatment operation.

11. The method of claim 1, further comprising:

automatically adjusting one or more operational parameters of the device based on the determined location of the device on the surface of the body part during the treatment operation.

12. A non-transitory computer readable medium storing computer readable code for providing guidance regarding orientation of a hand-held device on a subject during a treatment operation based on a location of the device on a surface of a body part of the subject during the treatment operation, wherein the device is comprises one or more orientation sensors for measuring orientation of the device in a reference frame of the device, the computer readable code being configured such that, on execution by a computer or processor, cause the computer or processor to:

obtain a three dimensional (3D) representation of the body part, the 3D representation comprising normal vectors for respective positions on the surface of the body part;

receive a plurality of orientation measurements from the one or more orientation sensors representing orientations of the device during the treatment operation on the body part;

determine in real-time or near real-time a sequence of orientations of the device during the treatment operation based on the plurality of orientation measurements;

determine in real-time or near real-time the location of the device on the surface of the body part during the treatment operation by comparing the sequence of orientations of the device to the normal vectors and respective positions of the normal vectors; and provide feedback to a user of the device based on the determined location of the device on the surface of the body part during the treatment operation, wherein the feedback comprises guidance or instructions to the user on moving or using the device on the surface of the body part of the subject.

13. A system comprising:

a device configured to perform a treatment operation on a body part of a subject, wherein the device comprises one or more orientation sensors for measuring orientation of the device in a reference frame of the device during the treatment operation; and an apparatus configured to provide guidance regarding orientation of a hand-held device on the subject during the treatment operation by determining a location of the device on a surface of the body part of the subject during the treatment operation, wherein the apparatus comprises a processing unit configured to:

obtain a three dimensional (3D) representation of the body part, the 3D representation comprising normal vectors for respective positions on the surface of the body part;

receive a plurality of orientation measurements from the one or more orientation sensors representing orientations of the device during the treatment operation on the body part;

determine in real-time or near real-time a sequence of orientations of the device during the treatment operation based on the plurality of orientation measurements;

determine in real-time or near real-time the location of the device on the surface of the body part during the treatment operation by comparing the sequence of orientations of the device to the normal vectors and respective positions of the normal vectors to determine the location of the device on the surface of the body part during the treatment operation; and provide feedback to a user of the device based on the determined location of the device on the surface of the body part during the treatment operation, wherein the feedback comprises guidance or instructions to the user on moving or using the device on the surface of the body part of the subject.

14. The system of claim 13, wherein the apparatus is comprised in the device.

15. The system of claim 13, wherein the apparatus is separate from the device.

16. The system of claim 13, wherein the processing unit is configured to compare the sequence of orientations of the device to the normal vectors and the respective positions of the normal vectors by identifying a sequence of normal vectors in the 3D representation having respective orientations that match the sequence of orientations of the device.

17. The system of claim 13, wherein the processing unit is configured to compare the sequence of orientations of the device to the normal vectors and the respective positions of the normal vectors by determining the location of the device on the surface of the body part as a position associated with a normal vector on the surface of the body part that has an orientation that matches a final orientation in the sequence of orientations of the device.

18. The system of claim 13, wherein the processing unit is further configured to:

receive a plurality of movement measurements from one or more movement sensors of the device representing movement of the device during the treatment operation on the body part; and determine a sequence of positions of the device during the treatment operation based on the plurality of received movement measurements, wherein the sequence of positions indicates a path in a reference frame of the device that the device has moved during the treatment operation.

19. The system of claim 13, wherein the processing unit is further configured to:

obtain an initial image that includes the device and the body part;

determine an orientation of the device relative to the body part using the initial image; and rotate the 3D representation of the body part according to the orientation of the device relative to the body part, wherein the processing unit is configured to compare the sequence of orientations of the device to the normal vectors and the respective positions of the normal vectors by comparing the sequence of orientations of the device to the normal vectors and respective positions of the normal vectors in the rotated 3D representation to determine the location of the device on the surface of the body part during the treatment operation.

20. The system of claim 13, wherein the device further comprises a treatment portion configured to contact the body part for performing the treatment operation, wherein the processing unit is configured to determine the sequence of orientations of the device during the treatment operation by:

rotating the orientation measurements such that the rotated orientation measurements represent an orientation of the treatment portion; and determining a sequence of orientations of the treatment portion during the treatment operation using the rotated orientation measurements, and wherein the processing unit is configured to compare the sequence of orientations of the device to the normal vectors and the respective positions of the normal vectors by comparing the sequence of orientations of the treatment portion to the normal vectors and respective positions of the normal vectors to determine the location of the device on the surface of the body part during the treatment operation.

* * * * *